United States Patent [19]

Lenz et al.

[11] Patent Number: 4,692,644
[45] Date of Patent: Sep. 8, 1987

[54] FLUID COOLED ACYCLIC GENERATOR ROTOR HAVING A COPPER CONDUCTOR DIFFUSION BONDED TO A MAGNETIC STEEL CORE

[75] Inventors: Henry G. Lenz, Scotia; Leonard Coffman, Schenectady; Adrian M. Beltran, Ballston Spa, all of N.Y.

[73] Assignee: General Electric Company, Pittsfield, Mass.

[21] Appl. No.: 923,358

[22] Filed: Oct. 27, 1986

Related U.S. Application Data

[62] Division of Ser. No. 812,033, Dec. 23, 1985, abandoned.

[51] Int. Cl.$^4$ ............................................. H02K 9/197
[52] U.S. Cl. ...................................... 310/178; 29/598; 228/193; 310/42; 310/61
[58] Field of Search ............................ 29/156.8H, 598; 228/127, 131, 174, 193; 310/42, 52, 54, 59, 178, 61

[56] References Cited

U.S. PATENT DOCUMENTS

| 2,106,842 | 2/1938 | Hague et al. | 310/178 |
| 3,447,002 | 5/1969 | Rönnevig | 310/54 |
| 4,096,615 | 6/1978 | Cross | 228/193 |
| 4,152,816 | 5/1979 | Ewing et al. | 228/193 |
| 4,270,256 | 6/1981 | Ewing | 228/193 |
| 4,602,177 | 7/1986 | Eckels et al. | 310/178 |

Primary Examiner—Patrick R. Salce
Assistant Examiner—D. L. Rebsch
Attorney, Agent, or Firm—Bailin L. Kuch

[57] ABSTRACT

An internally cooled rotor for an acyclic generator has a ferromagnetic steel core to which is diffusion bonded a cylindrical copper conductor in which is embedded a multiplicity of cooling tubes communicating with coolant passages formed in the core. The cooling tubes are implanted in a hot isostatic pressure process during which the copper cylinder is at least in part created by the densification of copper powder to a non-porous mass.

6 Claims, 3 Drawing Figures

HIP AUTOCLAVE 58

4,692,644

FLUID COOLED ACYCLIC GENERATOR ROTOR HAVING A COPPER CONDUCTOR DIFFUSION BONDED TO A MAGNETIC STEEL CORE

This is a divisional of co-pending application Ser. No. 812,033 filed on 12/23/85, now abandoned.

The present invention relates to electromagnetic machines and particularly to fluid cooled rotors for acyclic or homopolar generators.

Heretofore, acyclic generators, also known as homopolar or unipolar generators, have generally been designed as low power, constant duty DC generators or short duty cycle pulse generators. In these designs, the losses in the rotor are relatively low, to the point that generator performance has not been unduly limited. To increase the power capabilities and duty cycle of such DC generators without significantly increasing their physical size, the power density therein must be increased. This can be achieved by driving the rotor to higher rotational and thus circumferential velocities. The higher velocities reduces the flux magnitude required to produce a given voltage and thus the volume of material necessary to carry the main flux. Since acyclic generators are by their nature high DC current machines, and since their rotors must carry current as well as magnetic flux, the current density becomes quite high as power generating capacity is increased.

The rotor of a typical iron core acyclic generator consists of a ferromagnetic steel core for carrying main flux with one or more copper conductors affixed to the core periphery for carrying the high current. These conductors may be in the form of a copper cylinder or sleeve shrunk-fit on or adhesively bonded to the core periphery. Resorting to copper conductors, rather than the core steel, as the predominant current carrier, obviously reduces losses associated with high current densities. In addition, the presence of the copper conductor material reduces the effective rotor inductance and thus the magnitude of circumferential flux in the core steel. These factors minimize the field coil magnetomotive force and improve the transient current response of the rotor.

As the rotor current density is increased, dissipating the heat generated in the rotor current conductor becomes a major limiting factor. If the rotor is not adequately cooled, the mechanical stresses resulting from centrifugal forces and differential thermal expansion could destroy the rotor conductor structural integrity, since steel and copper alloy tensile strength decrease with increasing temperature.

It is accordingly an object of the present invention to provide an improved rotor for an acyclic generator.

A further object is to provide an acyclic generator rotor of the above-character which is capable of accommodating extremely high generator power densities.

Another object of the present invention is to provide an acyclic generator rotor of the above-character having provisions to accommodate internal cooling of the current conductor.

An additional object is to provide an acyclic generator rotor constructed with internal passages to accommodate the flow of a fluid coolant effective in removing heat from the current conductor.

Yet another object of the present invention is to provide a method of manufacturing an internally cooled acyclic generator rotor of the above-character.

Other objects of the invention will in part be obvious and in part appear hereinafter.

SUMMARY OF THE INVENTION

In accordance with the present invention, there is provided a rotor for a high power density acyclic generator having a one-piece ferromagnetic steel core for carrying the main flux and a high conductivity cylinder, preferably of copper, for carrying the main current; the latter being diffusion bonded to the core periphery. The core is provided with axially extending passageways, which communicate with radially extending passages and axially extending conduits embedded in the copper cylinder, to accommodate the circulation of a coolant effective in maintaining a cool-running rotor at elevated current densities. Further in accordance with the present invention, the cylindrical conductor is formed and diffusion bonded to the rotor core with the coolant conduits totally embedded in the conductor metal utilizing hot isostatic pressure (HIP).

The invention accordingly comprises the features of construction, conbination of elements, arrangement of parts, together with a method of manufacture, which will be exemplified in the construction and process steps hereinafter set forth, and the scope of the invention will be indicated in the claims.

For a fuller understanding of the nature and objects of the invention, reference should be had to the following detailed description taken in conjunction with the accompanying drawings, in which.

Like reference numerals refer to corresponding parts throughout the several views of the drawings.

DETAILED DESCRIPTION

Figure 1:
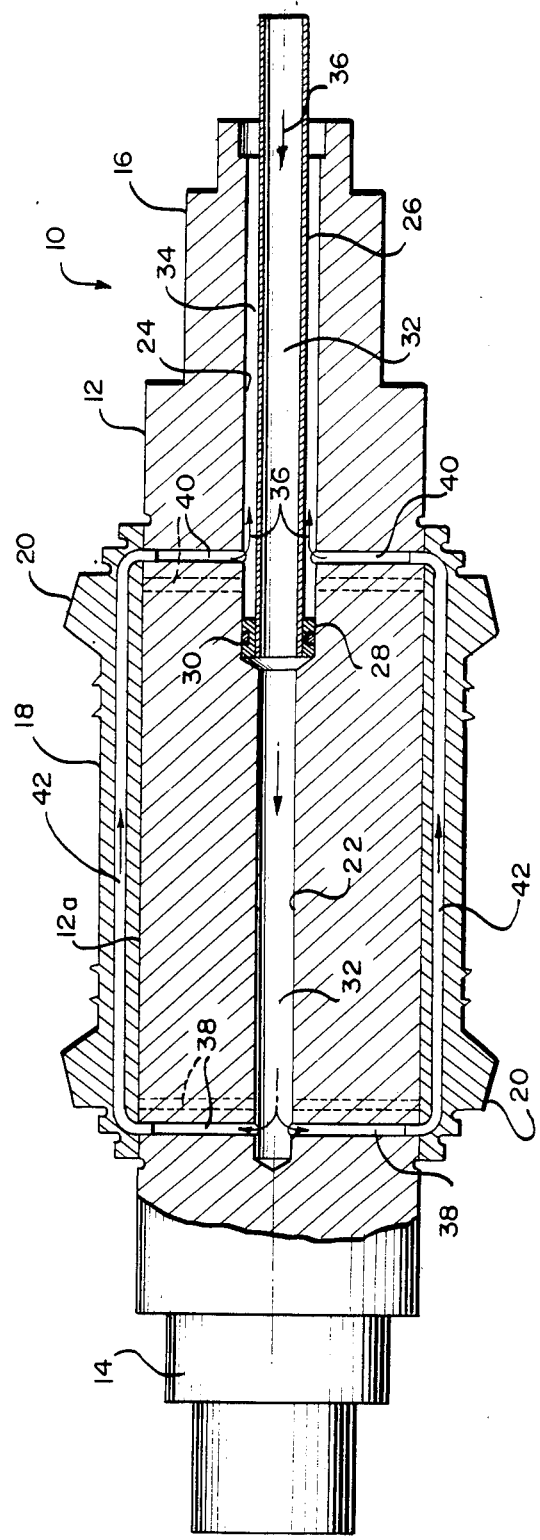
FIG. 1 is a side view, partially in section, of an acyclic generator rotor constructed in accordance with the invention.

Referring first to FIG. 1, an acyclic generator rotor, generally indicated at 10, comprises a forged ferromagnetic steel core 12 integrally formed with axial shaft extensions 14 and 16 by which the rotor is journalled and driven to high peripheral velocities. Bonded to the periheral surface 12a of the core is a current conductor in the form of a cylinder 18 of a highly electrically conductive metal, such as copper. This cylinder is appropriately machined to provide a pair of axially spaced, current collector ring surfaces 20 which cooperate with closely spaced, conforming stator current collector ring surfaces and an intervening collector medium, such as liquid metal, to transport the high DC current developed in the rotor to the stator and ultimately the generator output terminals (not shown). Also machined into the cylinder periphery in flanking relation to these rotor collector surfaces are suitable shoulders, grooves and lands which cooperate with complementing stator surface formations in containing the liquid metal being circulated in the collector gaps. For a detailed description of an acyclic generator utilizing liquid metal collectors, reference may be had to U.S. Pat. No. 3,211,936, issued to L. M. Harvey and assigned to the assignee of the instant application.

In accordance with the present invention, a concentric blind hole 22 is axially bored through shaft extension 16 and into core 12, terminating short of shaft extension 14. This hole is counterbored, as indicated at 24, to an axial depth beyond the right end of conductor cylinder 18. A stainless steel tube 26 is provided with a collar 28 which is welded about its inner end, such that the tube can be fitted into counter bore 24 to the bottom thereof. To assure a reasonably fluid-tight fit, collar 28 may be grooved to accommodate an O-ring seal 30. As will be seen, hole 22 together with tube 26 provide an axial passageway 32 accommodating the incoming flow of a liquid coolant, while the annular space between this tube and counterbore 24 provides a passageway 34 accommodating return flow, as indicated by arrows 36. It will be appreciated that the exterior termination of tube 26 and counterbore 24 are equipped with suitable rotating unions (not shown) for fluid-connecting these passageways with an appropriate heat exchanger and pump in closed loop fashion.

Figure 2:
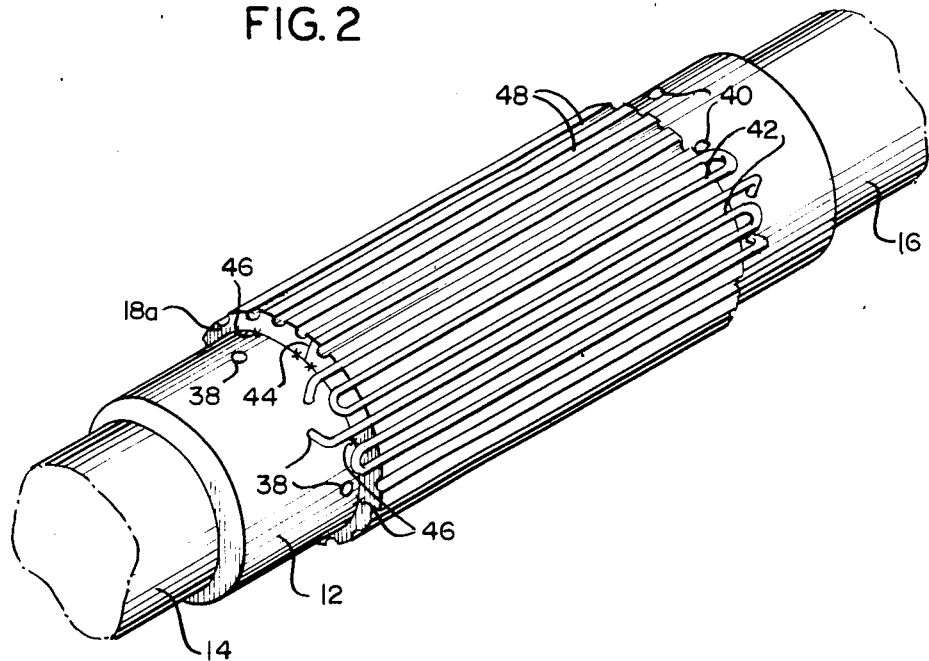
FIG. 2 is a fragmentary perspective view of the rotor of FIG. 1 at an intermediary stage of its manufacture.

Still referring to FIG. 1, just short of the inner termination of hole 22, a plurality of angularly spaced, radially directed passages 38 are drilled in core 12 into communication with axial passageway 32. Similarly, a plurality of angularly spaced, radially directed passages 40 are drilled in the core into communication with passageway 34 at a point short of its inner termination at collar 28. Embedded in conductor cylinder 18 are a plurality of conduits, such as stainless steel tubes 42, which extend substantially the entire axial length of the cylinder. One end of each tube is turned radially inwardly for insertion into the outer termination of a different one of the passages 38 and either welded or brazed in place. Likewise the other ends of these tubes are turned radially inward, inserted in the outer ends of passages 40, and affixed in place. It is thus seen that coolant can flow in through passageway 32, radially out through passages 38, axially through tubes 42, radially inward through passages 40 and axially out through passageway 34. Obviously, the above described direction of coolant circulation is arbitrary, and could be reversed. As seen in FIGS. 1 and 2, passages 38 alternate between axially offset positions around the circumference of core 12, as do passages 40, so as not to unduly prejudice the structural integrity of rotor 10. Also, as seen in FIG. 2, tubes 42 preferably serpentine axially back and forth an odd number of times, three in the illustration, in conveying coolant between passages 38 and 40. Suitable coolants are DOWTHERM J, available from Dow Chemical Company and COOLANOL marketed by Monsanto Chemical Company.

In accordance with the present invention, conductor cylinder 18 is diffusion bonded to the peripheral surface 12a of core 12 by a hot isostatic pressure (HIP) process and is at least in part created by the same process. In one form of the process for manufacuring the rotor 10 of FIG. 1, the peripherial surface 12a of the core is nickel plated, and then a sheet 18a of, for example, oxygen dispersion strengthened (ODS) copper is cut to size and wrapped around the core periphery with its axially arranged, cut ends butted together along a seam 44, as seen in FIG. 2. The sheet is spot welded to the core at numerous points as indicated at 46 and then machined to provide a plurality of full-length axially extending grooves 48 semi-circular in cross section such as to conform to the circular contour of tubes 42. The straight sections of these cooling tubes are seated in the grooves and held in place by suitable means such as welding, brazing or circumferential copper bands (not shown), leaving the tubes end-turn sections overhanging the axial ends of sheet 18a to facilitate their connections with radial passages 38 and 40. The integrity of these connections is checked with a mass spectrometer. Preferably, as in the case of the rotor, tubes 42 are nickel plated prior to installation, to promote diffusion bonding with copper.

Figure 3:
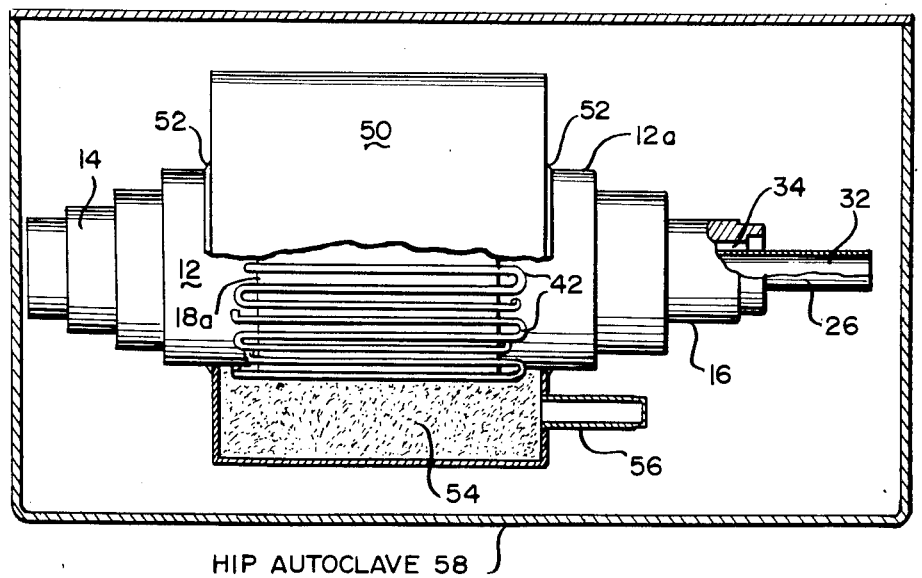
FIG. 3 is an elevational view, partially broken away, schematically illustrating the formation of the rotor conductor utilizing hot isostatic pressure apparatus.

Turning a FIG. 3, a metallic container 50, formed of a mild steel or an alloy such as inconel 600, is fabricated to envelope the cooling tubes 42 as assembled to the core (FIG. 2) and is affixed in sealed relation to core surface 12a by continuous circumferential weldments 52. The container is then loaded with an appropriate metallic powder 54, such as MZC copper powder, comprising, for example, 0.05% magnesium, 0.195% zirconium, 0.35% chromium and the remainder copper, through a fill tube 56. The assembly is vibrated during loading to compact the powder in container 50, and then heated in a furnace at approximately 1000° F. while maintaining a rough vacuum to outgas the powder 54. Fill tube 56 is then sealed off as illustrated in FIG. 3.

The assembly is then placed in a hot isostatic press or autoclave 58 which is raised to a temperature of approximately 1825° F. and a pressure of approximately 15,000 psi. These temperature and pressure conditions are held for a suitable period, such as two hours. It will be appreciated that these process parameters depend on the character of copper powder loaded into container 50. The container is crushed under this pressure, and its copper powder contents are densified to a non-porous mass which is diffusion bonded to the surfaces of core 12, sheet 18a and tubes 42 exposed within the container. Moreover, sheet 18a is at the same time diffusion bonded to core surface 12a at their interface. It is important to note that passageways 32 and 34 are vented to the autoclave ambient, and thus tubes 42 are pressurized to the autoclave pressure to prevent their collapse during the HIP process. The crushed container 50 is machined away, and the exposed copper cylinder is rough-machined to a symetrical shape. The rotor assembly is then heat treated in an inert gas environment, such as argon, at, for example, 1825° F. for one hour to relieve any stresses. Thereafter, the rotor assembly is rapidly cooled down to 850° F. and then aged in air for a suitable period, such as four hours to develop maximum tensile properties in the core 12 and conductor 18. Final machining can then be undertaken to create the surface configuration of cylindrical conductor 18 seen in FIG. 1 with cooling tubes 42 fully embedded therein and diffusion bonded at their copper-steel interfaces.

As an alternative to copper sheet 18a, its equivalent can be created by an intermediary HIP process. Thus, core 12 is nickel plated, and a container, similar to but appropriately smaller than conatiner 50, is welded in place. This container is filled with MZC copper powder, vibrated to compact the fill, and heated under vacuum to outgas the powder. The core and filled container are subjected to a HIP process to thus create a densified non-porous copper mass in the form of a sleeve or layer diffusion bonded to the core surface. This container is then machined away, and the sleeve is machined to a cylindrical shape and the array of axial grooves are cut into its peripheral surface in the manner of FIG. 2. The radial passages 38 and 40 are bored, and the nickel plated cooling tubes 42 installed in the manner discribed above to create the assembly seen in FIG.

2. The HIP process described above in conjunction with FIG. 3 is then performed. The assembly is rough machined, heat treated and finally machined to achieve the rotor of FIG. 1, all the fashion described above.

From the foregoing, it is seen that the present invention provides an internally cooled rotor for an acyclic generator which is capable of accommodating an order of magnitude increase in power density and duty cycle length, while enabling a significant reduction in the interval between duty cycles. Moreover, by virtue of the hot isostatic pressure process to effectively implant a multiplicity of cooling tubes with the bulk of the rotor conductor, a cool-running rotor is achieved at these elevated power densities. Moreover, by virtue of the present invention, the presence of these embedded cooling tubes does not prejudice, but in fact preserves the structural integrity of the rotor conductor at high peripheral velocities by limiting temperature rise in the rotor conductor. While the present invention has been described in its application to acyclic generation, it will be appreciated that it is equally applicable to acyclic motors.

It is thus seen that the objects set forth above, including those made apparent from the preceding description, are efficiently attained and, since certian changes may be made in the above construction or steps of the above method without departing from the scope of the invention, it is intended that all matters contained in the above description or shown in the accompanying drawings shall be interpreted as illustrative and not in a limiting sense.

Having described the invention, what is claimed as new and desired to secure by Letters Patent is:

1. A rotor for an acyclic electromagnetic machine, said rotor comprising, in combination:
   A. a core formed of ferromagnetic steel, said core having a peripheral surface and a plurality of internal passages opening into said peripheral surface for accommodating the circulation of a coolant;
   B. a current conductor diffusion bonded to said core peripheral surface; and
   C. a plurality of coolant tubes totally embedded in said conductor and affixed in coolant flow communication with said passages.

2. The rotor defined in claim 1, wherein said conductor is in the form of a cylinder uniformly diffusion bonded to said core throughout the interface of said cylinder and peripheral surface.

3. The rotor defined in claim 2, wherein said cylinder is formed of copper.

4. The rotor defined in claim 3, wherein said cylinder is at least in part formed as a densified non-porous mass from a copper powder in a hot isostatic pressure process.

5. The rotor defined in claim 2, wherein said passages include a first axially directed passageway for conveying incoming coolant, a second axially directed passageway for conveying outgoing coolant, a first plurality of radially directed holes connecting said first passageway in coolant flow communication with inlet ends of said tubes, and a second plurality of radially directed holes connecting said second passageway in coolant flow communication with outlet ends of said tubes.

6. The rotor defined in claim 5, wherein said cylinder is at least in part formed as a densified non-porous mass from a copper powder in a hot isostatic pressure process.

* * * * *

UNITED STATES PATENT OFFICE
CERTIFICATE OF CORRECTION

PATENT NO. : 4,692,644
DATED : September 8, 1987
INVENTOR(S) : Henry G. Lenz, Leonard Coffman, Adrian M. Beltran It is certified that error appears in the above-identified patent and that said Letters Patent are hereby corrected as shown below:

Front Page, item 62: change "Division of Ser. No. 812,033, Dec. 23, 1985, abandoned." to --Division of Ser. No. 812,033, Dec. 23, 1985, Pat. No. 4,679,314, July 14, 1987.--

Signed and Sealed this

Twelfth Day of April, 1988

Attest:

DONALD J. QUIGG

Attesting Officer

Commissioner of Patents and Trademarks